United States Patent
Kim

(10) Patent No.: US 8,699,706 B2
(45) Date of Patent: Apr. 15, 2014

(54) METHOD FOR GENERATING RIGHTS OBJECT AND DEVICE TO PERFORM THE METHOD, METHOD FOR TRANSMITTING RIGHTS OBJECT AND DEVICE TO PERFORM THE METHOD, AND METHOD FOR RECEIVING RIGHTS OBJECT AND DEVICE TO PERFORM THE METHOD

(71) Applicant: Pantech Co., Ltd., Seoul (KR)

(72) Inventor: Kun-uk Kim, Goyang-si (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/673,397

(22) Filed: Nov. 9, 2012

(65) Prior Publication Data

US 2013/0067230 A1    Mar. 14, 2013

Related U.S. Application Data

(63) Continuation of application No. 12/406,350, filed on Mar. 18, 2009, now Pat. No. 8,327,145.

(30) Foreign Application Priority Data

Mar. 26, 2008  (KR) .................. 10-2008-0027891

(51) Int. Cl.
*H04L 29/06*   (2006.01)

(52) U.S. Cl.
USPC .............. 380/44; 380/45; 380/46; 380/47; 380/277; 713/171

(58) Field of Classification Search
USPC .............. 380/44, 45, 46, 47, 277; 713/171
See application file for complete search history.

(56) References Cited

U.S. PATENT DOCUMENTS 7,512,798 B2 * 3/2009 Cahill et al. .................. 713/170
7,617,158 B2   11/2009 Bjorkengren et al.

(Continued)

FOREIGN PATENT DOCUMENTS

JP    2009-040894    2/2009
KR    10-2005-0058653   6/2005

(Continued)

OTHER PUBLICATIONS

OMA (Open Mobile Alliance), "OMA-TS-DRM-DRM-V2_0_2-20080723-A", DRM Specification, Approved Version 2.0.2, Jul. 23, 2008.

(Continued)

*Primary Examiner* — Andy Rao
*Assistant Examiner* — Shan Elahi
(74) *Attorney, Agent, or Firm* — H.C. Park & Associates, PLC

(57) ABSTRACT

A method for transmitting a Rights Object (RO) includes generating a password key by encrypting a password, generating the RO using the password key, and transmitting the RO from a first device to a second device. The second device and the first device share the password and the second device generates the password key using the same encryption method as that used by the first device to generate the password key. The second device decrypts a Message Authentication Code (MAC) key and a Rights Object Encryption Key (REK) using the password key, decrypts a Content Encryption Key (CEK) using the decrypted REK, and verifies integrity of the RO using the decrypted MAC key. The second device can use and/or access content associated with the RO using the decrypted CEK. The CEK may be generated by the first device or may be the CEK from a Rights Issuer.

12 Claims, 7 Drawing Sheets

(56) References Cited

U.S. PATENT DOCUMENTS

| | | | |
|---|---|---|---|
| 7,630,940 B2* | 12/2009 | Watanabe et al. | 705/52 |
| 7,711,959 B2* | 5/2010 | Schmidt et al. | 713/181 |
| 8,379,864 B2* | 2/2013 | Saarikivi et al. | 380/278 |
| 2003/0221099 A1 | 11/2003 | Medvinsky et al. | |
| 2004/0190868 A1 | 9/2004 | Nakano et al. | |
| 2005/0277403 A1* | 12/2005 | Schmidt et al. | 455/410 |
| 2006/0031164 A1* | 2/2006 | Kim | 705/51 |
| 2006/0041511 A1* | 2/2006 | Ahn | 705/51 |
| 2006/0154648 A1* | 7/2006 | Oh et al. | 455/411 |
| 2007/0011096 A1* | 1/2007 | Oh et al. | 705/54 |
| 2007/0033414 A1 | 2/2007 | Dunko | |
| 2007/0121942 A1* | 5/2007 | Watanabe et al. | 380/232 |
| 2007/0172065 A1* | 7/2007 | Lee et al. | 380/259 |
| 2007/0198419 A1* | 8/2007 | Park et al. | 705/52 |

FOREIGN PATENT DOCUMENTS

| | | |
|---|---|---|
| KR | 10-2006-0082806 | 7/2006 |
| KR | 10-2008-0005344 | 11/2008 |
| WO | 2006/075889 | 7/2006 |
| WO | 2006/075892 | 7/2006 |
| WO | 2006/075893 | 7/2006 |

OTHER PUBLICATIONS

Open Mobile Alliance, Doc#OMA-DLDRM-2007-00xx-CR_List_Rights Object_Basicinformation_Retrieval.doc; "Change Request", OMA-TS-SRM-V1_0-20070116-D.doc;Jan. 22, 2007.

Open Mobile alliance, "Change Request", OMA-TS-DRM-DRM-V2_0-20050908-C, Oct. 31, 2005.

Open Mobile alliance, "Input Contribution", OMA-DLDRM-2004-0155-SubmitRO, Aug. 4, 2004.

Espacenet search, Espacenet Result list Jul. 1, 2011.

OMA Protocol, OMA Device Management Protocol, Jun. 2006.

OMA Specification, Mobile Location Protocol 3.2, Nov. 2005.

DRM Architecture, DRM Architecture, Feb. 2008.

RFC 2898, PKCS #5: Password Based Cryptography Specification Version 2.0, Sep. 2000.

B. Kaliski, Password-Based Cryptographic Specification V2.0, http://www.rsa.com/rsalabs/node.asp?id=2124, Sep. 2000 p. 1-34, RSA Laboratories, Network Working Group, Request for Comments:2898, Category: Informational, USA.

Non-Final Office Action dated Jul. 22, 2011 issued for U.S. Appl. No. 12/406,350.

Final Office Action dated Jan. 18, 2012 issued for U.S. Appl. No. 12/406,350.

Notice of Allowance dated Aug. 2, 2012 issued for U.S. Appl. No. 12/406,350.

Notice of Allowance dated Sep. 14, 2012 issued for U.S. Appl. No. 12/406,350.

B. Kaliski, PKCS#5: Password-Based Cryptography Specification, Version 2.0, RSA Laboratories, Sep. 2000, The Internet Society, 2000, pp. 1-34.

* cited by examiner

METHOD FOR GENERATING RIGHTS OBJECT AND DEVICE TO PERFORM THE METHOD, METHOD FOR TRANSMITTING RIGHTS OBJECT AND DEVICE TO PERFORM THE METHOD, AND METHOD FOR RECEIVING RIGHTS OBJECT AND DEVICE TO PERFORM THE METHOD

CROSS-REFERENCE TO RELATED APPLICATION

This application is a continuation of U.S. application Ser. No. 12/406,350, filed on Mar. 18, 2009, which claims priority from and the benefit of Korean Patent Application No. 10-2008-0027891, filed on Mar. 26, 2008, both of which are hereby incorporated by reference for all purposes as if fully set forth herein.

BACKGROUND OF THE INVENTION

1. Field of the Invention

This invention relates to a digital rights management technology and, more particularly, to a method for generating, transmitting, and/or receiving a rights object (RO) as a part of digital rights management (DRM), and a device to perform one or more of the methods.

2. Discussion of the Background

Digital Rights Management (DRM) is a technology that protects and manages the rights of copyright holders of digital contents. DRM may include encryption, watermarking, and duplication prevention technologies.

Digital copyright data is encoded to DRM Content Format (DCF) digital content using a Rights Object (RO) including coded digital content and content access rights information, prior to distribution. A Rights Issuer (RI) creates the RO and provides it to a device that will use the DRM content. Because digital copyright data is accessible only with an RO having a key with which to decode the digital copyright data, a device that will use the DCF digital content should acquire the RO as well.

SUMMARY OF THE INVENTION

This invention provides a method for generating an RO based on a password, and a device to perform the method.

This invention also provides a method for transmitting an RO, and a device to perform the method.

This invention also provides a method for receiving an RO, and a device to perform the method.

Additional features of the invention will be set forth in the description which follows, and in part will be apparent from the description, or may be learned by practice of the invention.

This invention provides a method for generating an RO, including generating a password key by encrypting a password, and generating the RO using the password key.

This invention also provides a device for generating an RO, including a user input portion to receive a password, and a controller to generate a password key by encrypting the password, and to generate the RO using the password key.

This invention also provides a method for transmitting an RO, including generating a password key by encrypting a password, generating the RO using the password key, and transmitting the RO from a first device to a second device.

This invention also provides a device for generating an RO, including a user input portion to receive a password, a controller to generate a password key by encrypting the password, and to generate the RO using the password key, and a communication module to transmit the RO from the device to a receiving device.

This invention also provides a method for receiving an RO, including receiving the RO at a first device from a second device, generating a password key by encrypting a password shared between the first device and the second device, and interpreting the RO using the password key.

This invention also provides a device for receiving an RO, including a communication module to receive the RO from a transmitting device, a storage to store a password shared with the transmitting device, and a controller to generate a password key by encrypting the password, and to interpret the RO using the password key.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF THE ILLUSTRATED EMBODIMENTS

Figure 1:
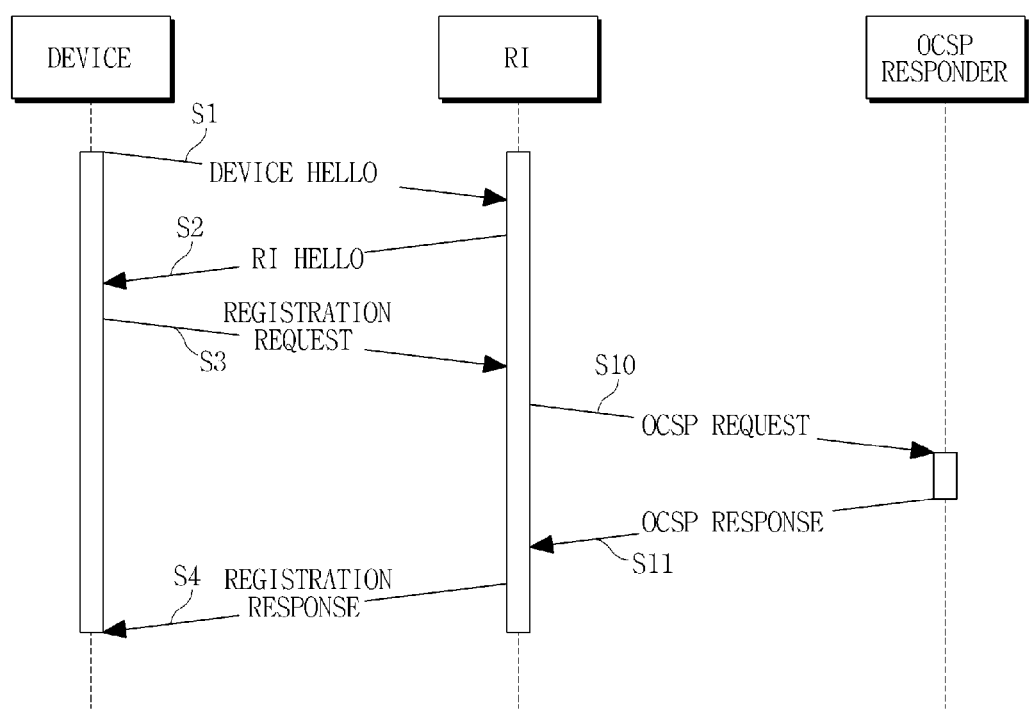
FIG. 1 illustrates a 4-pass registration protocol of Open Mobile Alliance (OMA) DRM v.2.0.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

If an element is referred to as being "connected to" another element, it can be directly connected to the other element, or intervening elements may be present. In contrast, if an element is referred to as being "directly connected to" another element, there are no intervening elements present.

FIG. 1 illustrates a 4-pass registration protocol of Open Mobile Alliance (OMA) DRM v.2.0.

According to OMA DRM v.2.0, a device registers with an RI by the 4-pass registration protocol to acquire an RO. The 4-pass registration protocol is used to exchange and register information for the device to communicate with the RI. If the 4-pass registration protocol is successful, the device acquires an RI context having information about the RI, and the RI preserves information about the device.

To be more specific, the above operation starts with the device's transmission of a Device Hello message carrying its basic information to the RI in step S1. Upon receipt of the Device Hello message, the RI transmits an RI Hello message with the RI information to the device in step S2. Upon receipt of the RI Hello message, the device transmits a Registration Request message to the RI, for registering with the RI in step S3.

In step S10, the RI transmits an Online Certificate Status Protocol (OCSP) Request message to an OCSP responder. The OCSP responder replies to the RI with an OCSP Response message in step S11. The RI, which has received the registration request, transmits a Registration Response message including the OCSP Response message to the device in step S4.

Figure 2:
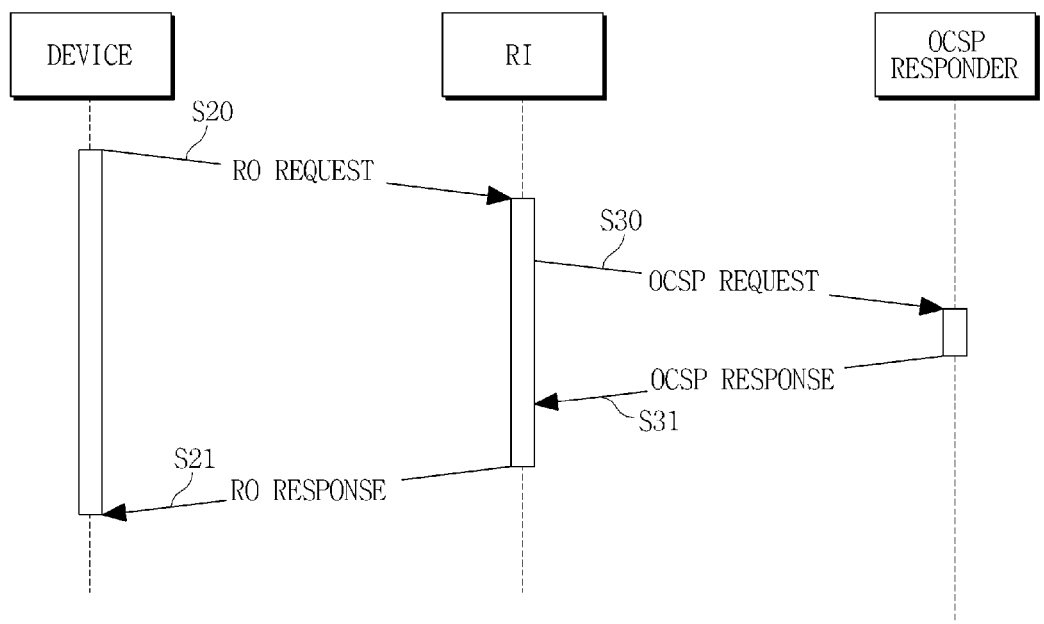
FIG. 2 illustrates a 2-pass RO acquisition protocol of OMA DRM v.2.0.

FIG. 2 illustrates a 2-pass RO acquisition protocol of OMA DRM v.2.0.

Once the device has registered with the RI in the manner illustrated in FIG. 1, the device acquires an RO in the following procedure. First, the device transmits an RO Request message to the RI in step S20, and the RI transmits an OCSP Request message to the OCSP responder in step S30. In step S31, the OCSP responder replies to the RI with an OCSP Response message. The RI, which has received the RO Request message, generates an RO and transmits it in an RO Response message to the device in step S21. The RO is encrypted with a public key of the device to prevent other devices from using the RO.

As described above, only the RI can generate an RO according to OMA DRM v.2.0. However, the device can generate the RO and transmit it to another device in accordance with an exemplary embodiment of the present invention.

A device is defined as a terminal capable of using digital content. The device can be any type of terminal including, for example, a mobile communication terminal, a digital TV, a Global Positioning System (GPS) navigator, a portable game player, and a Moving Picture Experts Group Layer 3 (MP3) player.

Figure 3:
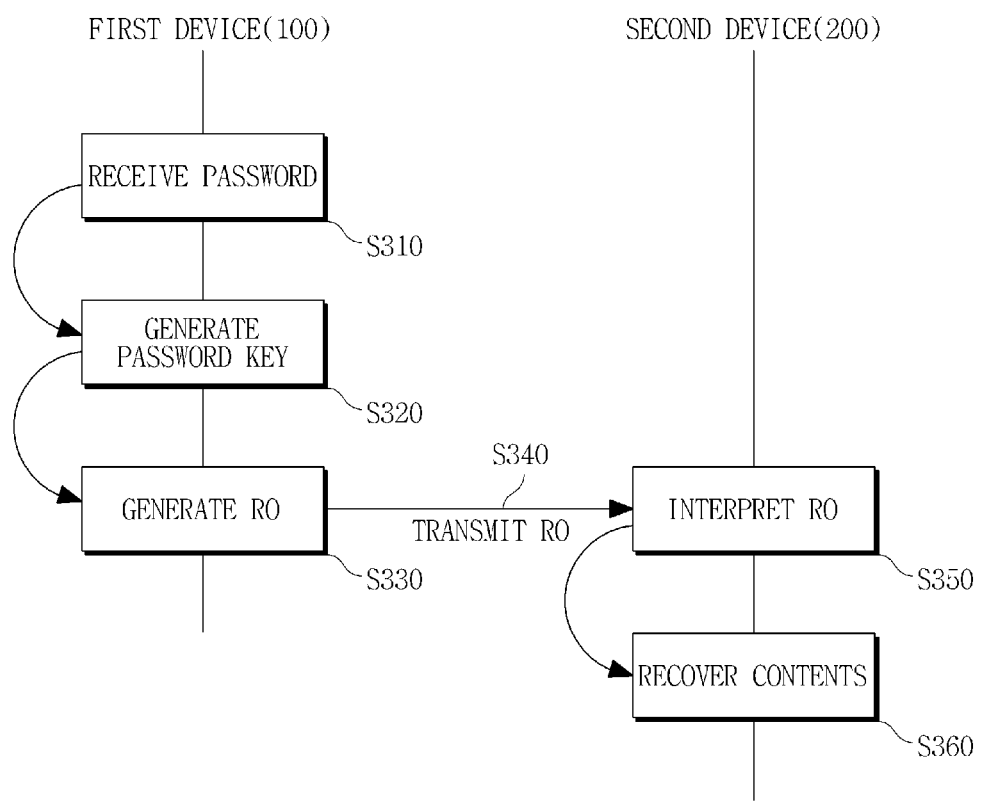
FIG. 3 illustrates an RO transmission operation between devices according to an exemplary embodiment of the present invention.

FIG. 3 illustrates an RO transmission operation between devices according to an exemplary embodiment of the present invention.

According to the exemplary embodiment of the present invention, a device can generate an RO based on a user-entered password and transmit the RO to another device. The RO can be transmitted separately or together with digital content associated with the RO in a DCF. Herein, the RO-transmitting device is referred to as a first device 100 and the RO-receiving device is referred to as a second device 200.

The first device 100 receives a password from the user in step S310 and generates a password key, which may have a predetermined length, using the password according to an encryption method in step S320. For example, the first device 100 receives a password of a predetermined length and a desired key length, and outputs a password key of the received key length by internal computation.

In accordance with the exemplary embodiment of the present invention, while the password key can be generated using a password-based encryption method complying with Public-Key Cryptography Standard (PKCS) #5, any other encryption method can be used if it provides added security over non-encryption and if the key can be generated by the resources available in the device.

Then, the first device 100 generates an RO using the password key in step S330 and transmits the RO to the second device 200 in step S340. The RO can be transmitted using a hardwired connection, Infrared Data Association (IrDA), Multimedia Messaging System (MMS), Universal Plug & Play (UPnP), or another method of transferring data from the first device 100 to the second device 200.

In step S350, after receiving the RO, the second device 200 interprets the RO and decrypts an encrypted Content Encryption Key (CEK) included in the RO. According to the exemplary embodiment of the present invention, the second device 200 can receive the password input to the first device 100 and generate the password key by encrypting the password using the same encryption method as that used in the first device 100. The second device 200 can then interpret the RO with the password key.

In step S360, the second device 200 can recover content by decrypting the content using the decrypted CEK. The content can be received together with the RO from the first device 100 or can be content already stored in the second device 200.

Figure 4:
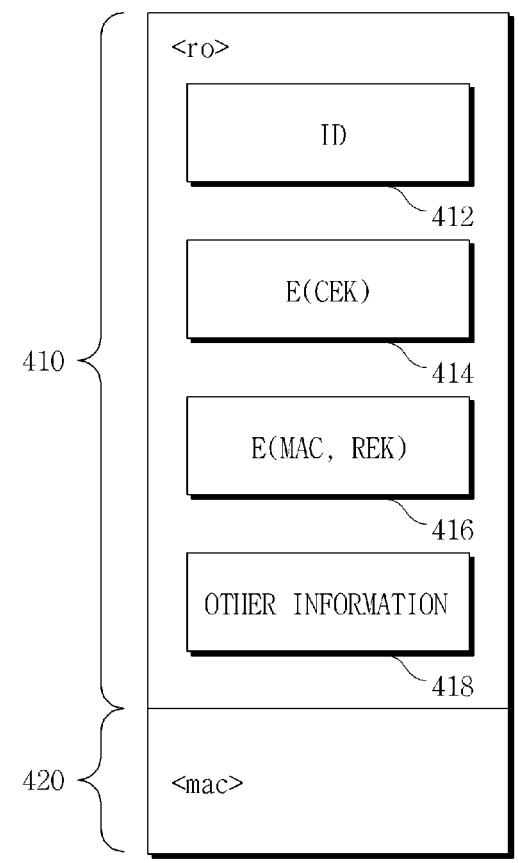
FIG. 4 illustrates an RO according to an exemplary embodiment of the present invention.

FIG. 4 illustrates an RO according to an exemplary embodiment of the present invention.

In accordance with the exemplary embodiment of the present invention, the RO may include an <ro> element 410 with content of the RO and a <mac> element 420 with information for verifying the integrity of the <ro> element 410. The RO can be generated in eXtensible Markup Language (XML).

Referring to FIG. 4, the <ro> element 410 can include an Identifier (ID) field 412 having a device ID, a first encryption key field 414 having an encrypted CEK (E(CEK)), a second encryption key field 416 having an encrypted Message Authentication Code (MAC) key and an encrypted Rights Object Encryption Key (REK) (E(MAC, REK)), and an other information field 418 having other information.

The RO is encrypted with the REK being a symmetric key. Hence, a user can acquire the CEK and access the digital contents only if the user has the REK.

The <mac> Element 420 may include a signature value of the <ro> element 410 signed with the MAC key, which is encrypted and inserted in the second encryption key field 416.

Figure 5:
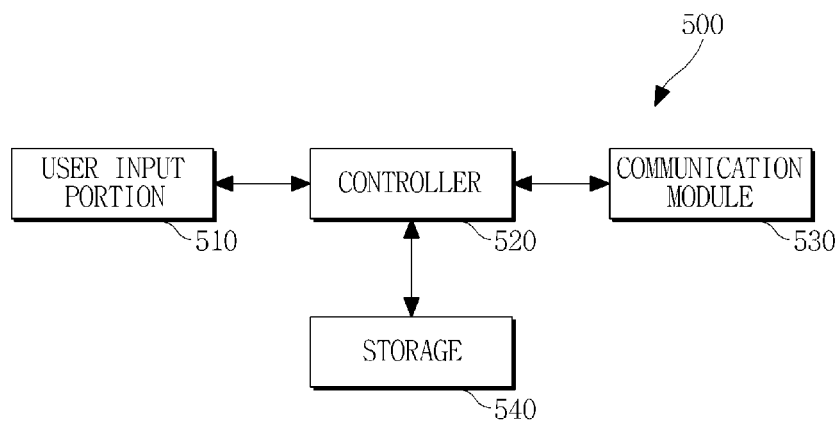
FIG. 5 illustrates a device for generating, transmitting, and/or receiving an RO an RO according to an exemplary embodiment of the present invention.

FIG. 5 illustrates a device for generating, transmitting, and/or receiving an RO according to an exemplary embodiment of the present invention.

In accordance with the exemplary embodiment of the present invention, a device 500 includes a user input portion 510, a controller 520, a communication module 530, and storage 540.

The user input portion 510 can be a user interface device, such as an alpha-numeric keypad or QWERTY-style keyboard, either type using for example physical buttons or a touch-screen, for receiving inputs including a password from a user. The controller 520 provides overall control of the operations of the device 500, including data input/output between components of the device 500. The communication module 530 may include an interface for communicating with an external device, such as a wired/wireless Internet, Bluetooth, Universal Serial Bus (USB), or IrDA communication interface. The storage 540 can store programs used for the operations of the device 500 or various pieces of information including content, for example, multimedia content.

Operation of the device 500 as a first device that generates and transmits an RO will first be described below.

Upon receipt of a password from the user, the device 500 can generate a password key of a predetermined length by encrypting the password and generate an RO using the password key. As described above, password-based encryption method of PKCS #5 or another method can be used for the password key generation.

The controller 520 can generate an REK for encrypting a CEK, and a MAC key for verifying the integrity of the RO. Also, the controller 520 can encrypt the CEK using the REK and encrypt the REK and the MAC key using the password key.

For content originally or previously associated with an RO received from an RI, the CEK can be a CEK included in the RO received from the RI. On the other hand, if the RO-transmitting device generates the contents, it can also generate the CEK for content encryption.

The controller 520 can generate an RO using the encrypted CEK (E(CEK)) and the encrypted MAC key and REK (E(MAC, REK)). Specifically, the controller 520 can generate an RO that includes an <ro> element with an ID field having a device ID inserted, a first encryption key field having an encrypted CEK (E(CEK)), a second encryption key field having an encrypted MAC key and an encrypted REK (E(MAC, REK)), and a <mac> element that is signed with the MAC key.

The controller 520 controls the communication module 530 to transmit the RO to another device that can share the user-entered password.

Now operation of the device 500 as a second device for receiving an RO will be described.

The RO-receiving device 500 first stores a password shared with or received from another device that transmits an RO. The password may be stored in the storage 540 of the device 500.

Upon receipt of the RO from another device in the communication module 530, the controller 520 generates the password key of a predetermined length by encrypting the stored password and interprets the RO using the password key.

The controller 520 decrypts the encrypted MAC key and the encrypted REK (E(MAC, REK)) included in the RO using the password key. The controller 520 decrypts the encrypted CEK (E(CEK)) included in the RO using the decrypted REK. Further, the controller 520 can verify the integrity of the RO by checking a signature value included in the <mac> element of the RO using the decrypted MAC key.

The controller 520 can also recover content by decrypting the content using the decrypted CEK. The recovered content can be used or output, for example, through an output device (not shown) such as a speaker or a display of the device, or a speaker or display connected to the device.

Figure 6:
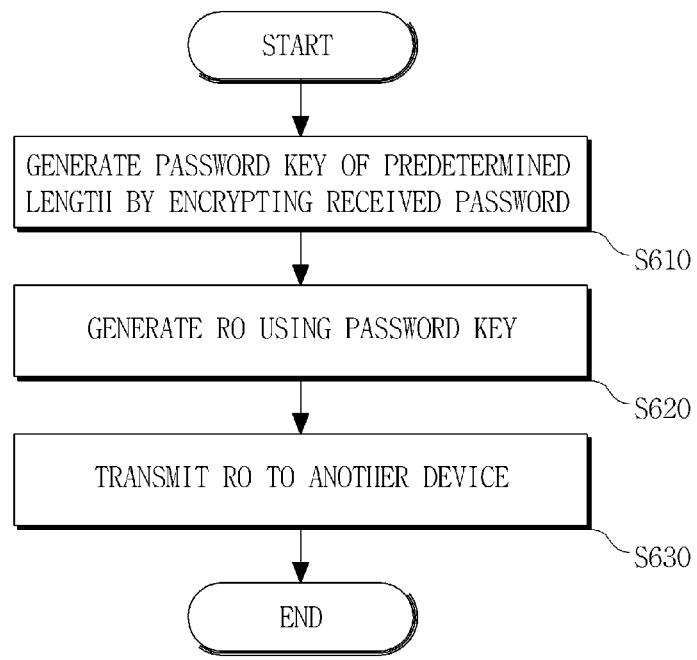
FIG. 6 is a flowchart illustrating a method for generating and transmitting an RO according to an exemplary embodiment of the present invention.

FIG. 6 is a flowchart illustrating a method for generating and transmitting an RO according to an exemplary embodiment of the present invention.

To generate and transmit an RO, a device generates a password key by encrypting a password in step S610, and creates an RO using the password key in step S620. The RO can then be transmitted to another device in step S630. The password can be shared between the RO-transmitting device and the RO-receiving device in this step or before this step, such as even before the password-generating step of S610.

Figure 7:
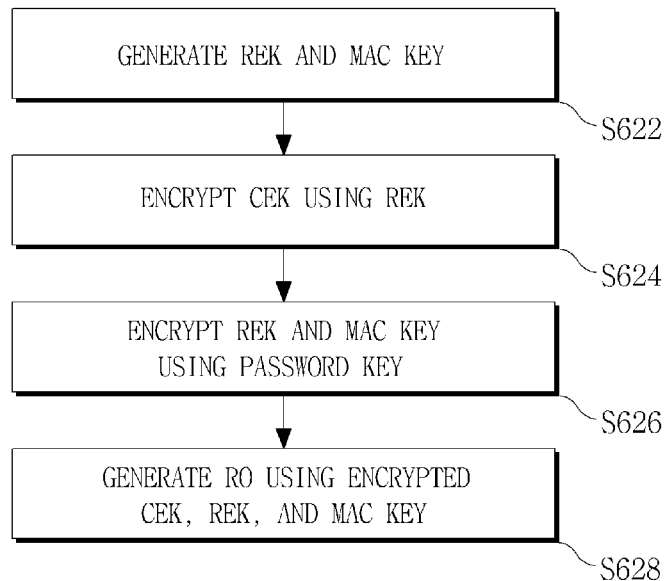
FIG. 7 is a flowchart illustrating a method for generating an RO according to an exemplary embodiment of the present invention.

In accordance with the exemplary embodiment of the present invention, the RO can be generated in the procedure illustrated in FIG. 7.

FIG. 7 is a flowchart illustrating a method for generating an RO according to an exemplary embodiment of the present invention.

To generate the RO, the device generates an REK for encrypting a CEK, and a MAC key for verifying the integrity of the RO in step S622. In step S624, the device encrypts the CEK using the REK.

For content associated with an RO received from an RI, the CEK can be a CEK included in the received RO in step S624. On the other hand, if the RO-transmitting device generates the content or receives the content without DRM from a third device, the RO generation step S620 may include generating the CEK. Herein, the device can generate the CEK.

In step S626, the device encrypts the REK and the MAC key using the password key. As described above, the password key may be generated at step S610. The device can generate the RO using the encrypted CEK (E(CEK)) and the encrypted REK and MAC key (E(MAC, REK)) in step S628. In this step, the RO may also include an ID field and a <mac> element.

Figure 8:
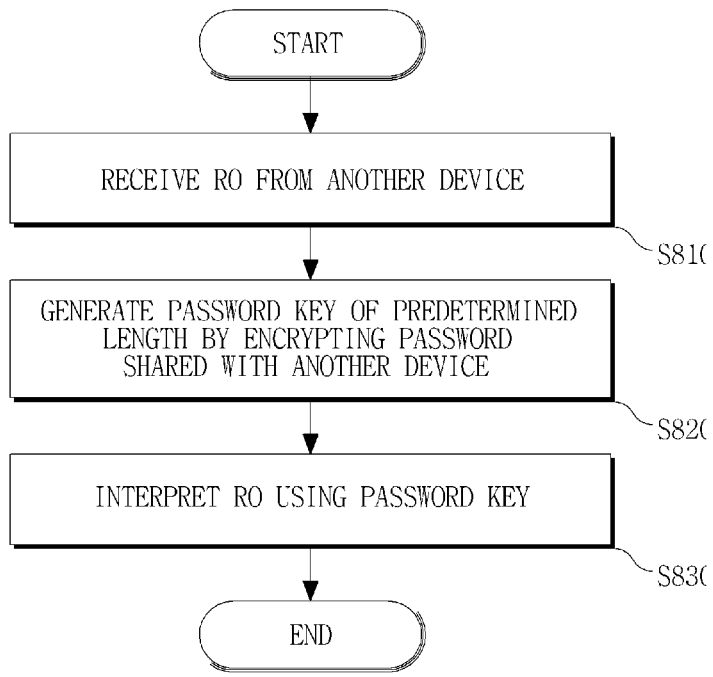
FIG. 8 is a flowchart illustrating a method for receiving an RO according to an exemplary embodiment of the present invention.

FIG. 8 is a flowchart illustrating a method for receiving an RO according to an exemplary embodiment of the present invention.

A device receives an RO from another device in step S810 and generates a password key of a predetermined length by encrypting a password in step S820. The password may be shared with the RO-transmitting device in step S810, or may be shared between devices at some point before step S810, such as through a registration step that may occur between devices. In step S830, the device interprets the RO using the password key.

Figure 9:
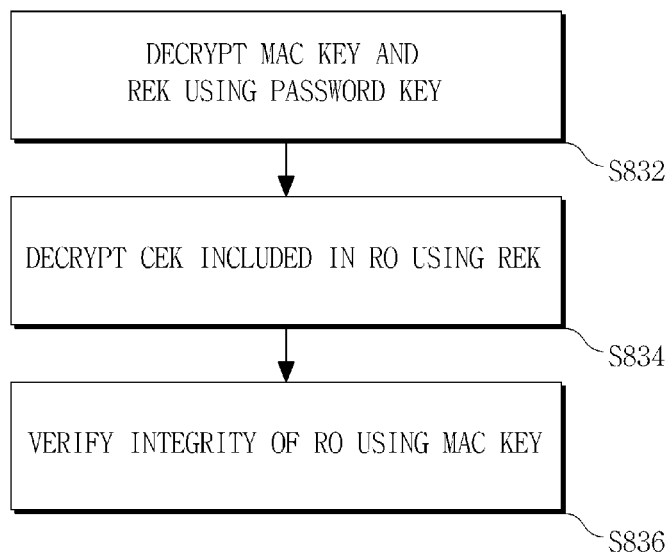
FIG. 9 is a flowchart illustrating a method for interpreting an RO according to an exemplary embodiment of the present invention.

The RO interpretation can be carried out according to the procedure illustrated in FIG. 9.

FIG. 9 is a flowchart illustrating a method for interpreting an RO according to an exemplary embodiment of the present invention.

To interpret the RO, the device receiving the RO first decrypts the encrypted MAC key and REK (E(MAC, REK)) included in the RO using the password key in step S832. Then, the device decrypts the encrypted CEK (E(CEK)) included in the RO using the decrypted REK in step S834. In step S836, the device verifies the integrity of the RO using the decrypted MAC key.

The device can also decrypt content using the decrypted CEK.

As described above, a device can generate and transmit an RO to another device. Therefore, for content received from an RI, a device that is allowed to generate and transmit an RO can transmit the RO to another device by using a shared password as a password to encrypt and decrypt the RO. This way, the receiving device can receive content from the transmitting device and also use the content without having to first perform direct communication with the RI.

For content generated by the device, the device can transmit the content to another device by using a shared password as a password to encrypt and decrypt the RO, without having to first register the content to a content management server, so that the receiving device can access and use the content. Therefore, contents can be transmitted and received more freely between devices that share a password, with better security to protect the content.

The above-mentioned method according to the present invention may be stored in any form of recording media, such as CD-ROM, RAM, ROM, floppy disk, hard disk, or magneto-optical disk, or in any computer-readable form, such as computer code organized into executable programs, and the method stored as a program in such recording media may be executed by any sort of computer or device including a processor and a readable memory.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for generating a Rights Object (RO), the method comprising:
    receiving a password via an input unit;
    generating a password key by encrypting a password;
    generating a REK(Rights Object Encryption Key) for encrypting a CEK(Content Encryption Key);
    generating a MAC(Message Authentication Code) key for verifying integrity of the RO;
    encrypting the CEK using the REK; and
    encrypting the REK and the MAC key using the password key,
    generating the RO using at least one of the encrypted CEK, the encrypted REK, and the encrypted MAC key.

2. The method of claim 1, wherein the password is shared between a first device and a second device.

3. The method of claim 2, wherein the generated RO is transmitted to the second device.

4. The method of claim 1, wherein, if the RO is for content associated with a received RO, the RO is received from a Rights Issuer (RI) and the CEK is a CEK included in the received RO.

5. The method of claim 1, further comprising:
    generating the CEK for encrypting content associated with the RO.

6. The method of claim 1, wherein the RO comprises at least one of an <ro> element and a <mac> element signed with the MAC key, the <ro> element comprising an Identifier (ID) field with a device ID, a first encryption key field comprising the encrypted CEK, and a second encryption key field comprising the encrypted MAC key and the encrypted REK.

7. The method of claim 1, wherein generating the password key comprises generating the password key using a password-based encryption method of Public-Key Cryptography Standard (PKCS) #5.

8. The method of claim 3, wherein the generated RO is transmitted using at least one of a hardwired connection, an Infrared Data Association (IrDA), a Multimedia Messaging System (MMS), and a Universal Plug & Play (UPnP).

9. The method of claim 1, wherein the RO is generated in eXtensible Markup Language (XML).

10. The method of claim 1, wherein the RO is encrypted with the REK, the REK being a symmetric key.

11. A method for decrypting a Rights Object (RO), the method comprising:
    receiving the RO at a first device, the RO comprises at least one of an encrypted CEK(Content Encryption Key), an encrypted REK(Rights Object Encryption Key), and an encrypted MAC(Message Authentication Code) key;
    decrypting the RO using a password key, the password key generated by encrypting a password shared between the first device and a second device;
    decrypting the encrypted REK and the encrypted MAC using the password key;
    decrypting the encrypted CEK using the decrypted REK; and
    verifying integrity of the RO using the decrypted MAC key.

12. The method of claim 11, further comprising:
    recovering content by decrypting the content using the decrypted CEK, the content associated with the RO.

* * * * *